United States Patent [19]

Lee

[11] Patent Number: 4,866,110

[45] Date of Patent: Sep. 12, 1989

[54] THERMOPLASTIC COMPOSITIONS, RESIN MOLDED PRODUCT FOR VEHICLE LINING AND METHOD FOR MANUFACTURING THE SAME

[75] Inventor: Chang Y. Lee, Busan, Rep. of Korea

[73] Assignee: Han Il E'wha Co., Ltd., Seoul, Rep. of Korea

[21] Appl. No.: 71,743

[22] Filed: Jul. 9, 1987

[30] Foreign Application Priority Data

Jul. 9, 1986 [KR] Rep. of Korea ............ 5524/1986[U]

[51] Int. Cl.$^4$ .......................... C08K 5/54; C08K 3/34; C08L 35/00

[52] U.S. Cl. ........................................ 524/11; 524/13; 524/15; 524/34; 524/448; 524/452; 524/492

[58] Field of Search ....................... 524/11, 13, 15, 34, 524/9, 448, 452, 492, 442

[56] References Cited

U.S. PATENT DOCUMENTS 4,686,257  8/1987  Mitsuno et al. ...................... 524/13
4,746,688  5/1988  Bistak et al. .......................... 524/15

FOREIGN PATENT DOCUMENTS 0085840  7/1978  Japan .................................... 524/11

*Primary Examiner*—John Kight
*Assistant Examiner*—Nathan M. Nutter
*Attorney, Agent, or Firm*—Willian, Brinks, Olds, Hofer, Gilson & Lione

[57] ABSTRACT

A thermoplastic molded product useful in vehicle linings such as door trim, shelf covering and package trays is formed from a resin into a thin plate. The product is formed from a substantially uniform admixture of from about 50 to 60 weight percent of a polypropylene, from 30 to 35 weight percent of a wood flour, from 2 to 3 weight percent of a leather powder, from 2 to 3 weight percent of a defatted rice bran powder, from 2 to 3 weight percent of an asbestos fiber, from 2 to 2.5 weight percent of a waste cotton, from 1.7 to 2.3 weight percent of a chopped glass fiber, and from 0.8 to 1.2 weight percent of a calcined diatomaceous earth.

10 Claims, No Drawings

THERMOPLASTIC COMPOSITIONS, RESIN MOLDED PRODUCT FOR VEHICLE LINING AND METHOD FOR MANUFACTURING THE SAME

BACKGROUND OF THE INVENTION

The present invention is directed to Thermoplastic Compositions Resin Molded Products which are useful for vehicle linings such as door trim, shelf covering and package trays and to a method for manufacturing thermoplastic resin molded products which are useful in the vehicle lining field. And more particularly, the thermoplastic resin molded products disclosed herein are in the form of a thin plate, which is formed from a homogeneous admixture of thermoplastic resin, fillers, and additives.

There have been a number of approaches for manufacturing vehicle lining materials and similar products such as wood substitutes, plastic products and the like. For example, the Korean Patent Publication No. 234/1975 (Published July 9, 1975; for a Method for Manufacturing Substitute Wood Products) discloses compositions which comprise mainly briquette ash and waste rubber as the primary raw materials.

This composition functioned as a substitute wood product, but was relatively heavy, was difficult to mold and had poor heat resistance and workability, and high cost.

A second approach is disclosed in Korean Patent Publication No. 1091/1979 (Published Aug. 26, 1979, Moldable Synthetic Resin Composition). This reference discloses a composition of novolak type phenol resin and silicic acid hydrate Aluminium ($Al_2O_3.2SiO_2.2H_2O$) as fillers. The composition has excellent release properties but poor workability and moldability.

A further approach is disclosed in Korean Patent Publication No. 88/1979 (Published Mar. 12, 1979); for A Method For Manufacturing Nonflammable Substitute Plastic Products. This reference discloses a method which comprises adding additives such as briquette ash, diatomaceous earth, pitch, waste rubber etc and fire retardants. The product has good fire retardant properties, but is relatively heavy and may be harmful to the environment.

The Japanese Patent Publication No. 42008/1977 (Published Sept. 16, 1983) discloses a method for coloring a wood flour filled thermoplastic resin. However, the method disclosed therein uses the wood flour only as a means for coloring the product. Further, the product has relatively poor heat resistance, water absorption and shrinkage.

The Japanese Patent Publication No. 41324/1982 (Published Sept. 2, 1982) for; A Method For Extruding Filler-Containing Thermoplastic Resin discloses a method for extruding admixtures of thermoplastic resin and inorganic fillers. The fillers include talc, calcium carbonate, and kaolin. Therefore, the products have relatively weak tensile strength and flexural strength and are also relatively heavy in weight.

The Japanese Patent Publication No. 38368/1981 (Published Sept. 5, 1981); discloses A Method For Manufacturing Particle Crystalline Polyolefin for use in molding. This publication discloses a method which incorporates inorganic fillers such as talc, kaolin, magnesium carbonate, calcium, carbonate, barium sulphate; titanium oxide and zinc oxide. The products using the above fillers have relatively poor tensile strength and flexural strength. Further, the products are relatively heavy.

The U.S. Pat. No. 3,976,608 (issued Aug. 24, 1976); discloses a process which incorporates fillers such as calcium carbonate, talc, asbestos fibres, glass fibres, wood sawdust, wood flour and mica and polystyrene; and a moldable filled polystyrene product. However, these products which include the listed fillers are less satisfactory as fire retardants, and have less dimensional stability and tensile strength than the improved products disclosed herein.

SUMMARY OF THE INVENTION

It is a primary object of this invention to overcome the deficiencies of the prior art as discussed above by providing thermoplastic resin compositions and molded products for use as vehicle linings. The compositions include polypropylene resin; wood flour, leather powder, and defatted rice bran as fillers. Asbestos, waste cotton and/or chopped glass fiber, calcined diatomaceous earth or mixtures thereof are preferably used as additives. And, the resulting resin compositions or mixtures have excellent mold-ability and adhesion, and are relatively light in weight.

It is another object of the subject invention to provide a thermoplastic resin composition for use in the vehicle lining field comprising a mixture of polypropylene as the thermoplastic resin; wood flour, leather powder and defatted rice bran as fillers which may be obtained from various industrial waste; and waste cotton or chopped glass fibers which may also be obtained from industrial waste, and/or asbestos and calcined diatomaceous earth, in given amounts, respectively.

Still another object of the subject invention is to provide a method for manufacturing the thermoplastic resin molded products for use in the vehicle lining field comprising mixing polypropylene resin of the type which is suitable for injection molding; wood flour, leather powder and defatted rice bran; asbestos, waste cotton, chopped glass fiber, and calcined diatomaceous earth; mixing thoroughly the mixture by means of an extruder-mixer at a given temperature; extruding the mixture by an extrusion molding machine, and controlling the desired thickness of the product by means of a conventional 3 roll mill.

In essence, a thermoplastic product according to a preferred embodiment of the invention comprises a mixture of about 50 to 60 weight percent polypropylene and about 30 to 35 weight percent wood flour. The product also includes other fillers, such as about 2 to 3 weight percent leather powder and about 2 to 3 weight percent defatted rice bran powder. In addition, the composition includes about 2 to 3 weight percent asbestos, about 2 to 2.5 weight percent cotton, about 1.7 to 4.0 weight percent glass fiber preferably 1.7 to 2.3 weight percent, and about 0.8 to 1.2 weight percent diatomaceous earth. The product is manufactured by mixing the aforementioned material in an extruder mixer or extrusion-molding machine and extruding a controlled thickness of the material through a heated die. And, the thickness is further controlled by passing the product through a conventional 3 roll mill.

DETAILED DESCRIPTION OF THE INVENTION

The thermoplastic resin, fillers and additives incorporated in the present invention will be described in greater detail.

First, a thermoplastic resin found to be most suitable for vehicle linings is, polypropylene of the type commonly used for extrusion molding products. Polypropylene which is particularly suitable for the present invention have an average molecular weight of about 800,000.

The physical properties of the polypropylene resin which are suitable for injection molding are typically as follows.

| | |
|---|---|
| Melt flow index (g/10 min) | 1.5 |
| Mold Shrinkage | 1.6–1.7% |
| Ultimate Temperature | 270–280° C. |
| Tensile yield strength (KG/Cm$^2$) | 270 |
| Flexural Stiffness | 8,800 Kg/Cm$^2$ |
| Flexural modulus of elasticity (Kg/Cm$^2$) | 13,000 |
| Softening point (Vicat. 1Kg) | 145° C. |
| Brittleness temperature | −20° C. |
| Charry (notched) (Kg.Cm/Cm$^2$) | 23° C. →24.9° C. |
| | −10° C. →5.0° C. |
| Heat aging | (hour) 130° C. |
| Hardness (rockwell) | 95° |
| Heat distortion temperature (4.6Kg) | 110° C. |
| IZOD. (Notched) (Kg.Cm/Cm$^2$) | 23° C. →13.2 |
| | −10° C. →4.3 |
| Weather resistance (weather-o-meter) | 150–200 hours |
| Air Oven | greater than 500 hours |

(When the polypropylene is heated in an air oven at 130° the polypropylene is durable at the elevated temperature far in excess of 500 hours.)

When extrusion molding products are obtained by using only a polypropylene resin as shown above, physical properties such as incombustibility, tear strength (Cycle test, 100° C.–40° C.), flexural strength, softening point and melting point of the molding products were not satisfactory for use as a vehicle lining material.

It has now been found that the physical properties of molded products may be significantly improved and used in the vehicle lining field by adding selected fillers and additives to the thermoplastic resin. It has also been found that some of the filler and additives can be readily and inexpensively obtained from industrial waste materials.

It has also been found that a new improved thermoplastic resin molded product which is heat resistant, durable, and fiber reinforced may be obtained by mixing a thermoplastic resin and organic materials selected from industrial wastes. In addition it has been found that mass production with such materials is possible, and when the mixtures are incorporated in the molding products, dimensional stability and workability are improved. In addition such products can be manufactured without lubricants or other harmful chemicals. Also the products according to the present invention have improved corrosion resistance, light weight, stiffness, strength, heat resistance and less shrinkage after molding.

The fillers and additives, some of which may be obtained from industrial waste, will now be described in greater detail.

A. Wood Flour

When wood is sawed or cut, large amounts of saw dust or wood flour is generally produced. This wood flour has frequently been used as a filler in the field of rubber and plastics, but has been considered unacceptable for many applications because of the tendency to absorb water. For that reason the wood flour has not been used more extensively in plastics. Mixing thermoplastic resin and polybenzene derivatives was also considered. However, as a result of that study, there were still deficiencies.

Therefore, in order to overcome the deficiencies, other substances were mixed with the thermoplastic resin to compensate for the wood flour's shortcomings. For example, the acid substances in wood flour have an adverse effect on pH values of the thermoplastic resin and tend to shorten a molded material's life. Further, heat resistance and water resistance are reduced and shrinkage increases. Nevertheless there are advantages to be obtained by using wood flour. For example the wood flour is relatively inexpensive and has easy miscibility.

Accordingly, in order to compensate for the defects of the wood flour the wood flour should be reinforced with defatted rice bran for neutralizing the acid in the wood flour. And in order to compensate for the relatively poor heat and water resistance, the wood flour should be reinforced by asbestos and/or glass fiber.

B. Leather Powder

Leather powder is obtained by drying and powdering the waste products from finishing leather. The leather powder contains gelatin and collagen, but collagen is the major ingredient and contains amino acids. However, it has now been found that such material provides improved adhesion and can be added to the thermoplastic resin used in the present invention.

C. Defatted Rice Bran

The defatted rice bran powder product is a fine powder having specific a gravity of about 0.33. Defatted rice bran powder is obtained by removing half or more of the drying oil obtained by pressing or bleaching rice bran. The product can be obtained from waste gained after production of an edible oil. After purification of the edible oil, free fatty acids, and glycerides of oleic acid, linoleic acid and palmitic acid, and lead esters, squalene, myricyl alcohol and stearin are left and have mutual affinity upon reaction with a thermoplastic resin. Thus, effects of solidification of the defatted rice bran are improved.

The light weight of the defatted rice bran powder having a specific gravity of 0.33 is beneficial formulating compounds according to the present invention. In addition, the defatted rice bran powder has good chemical resistance and high plasticity.

D. Asbestos

A preferred form of asbestos for use in accordance with the present invention is chrysotile with physical properties as follows:

| | |
|---|---|
| Chemical formula: | $3Mgo.2Sio_2.2H_2O$ |
| Color: | White |
| Spinning: | Excellent |
| Specific Gravity: | 2.4–2.6 |
| Fiber Length: | Long |
| Tear Strength (Kg/Cm$^2$): | 200–400 |

When chrysotile fiber of this type and thermoplastic resin are mixed, the mixtures are nonflammable, heat resistant, absorption and chemical resistant, and show improved aging resistance and electric insulation properties.

E. Waste Cotton

Waste cotton is typically obtained from a spinning process. The cotton has a fiber length of about 0.9–2.5 Cm and a cellulose composition which includes glycerides of palmitic acid, oleic acid and linolenic acid.

The waste cotton used in accordance with the present invention has physical properties as follows:

| | |
|---|---|
| Strength (Kg/Cm$^2$): | 3.0–4.9 |
| Elongation (%): | 3–7 |
| Hardness (g/d): | 57–60 |
| Water absorption (%): | 24–27 |

When the waste cotton is mixed with the thermoplastic resin, the mixtures have high heat resistance, good alkali resistance and chemical resistance. In addition, the cotton improves bonding and provides strength reinforcement because of the fiber length. Also the waste cotton may be obtained at a very small cost.

F. Glass fiber(chopped)

In preparing glass fiber filament bundles for use in yarns or rovings, a significant amount of waste glass fiber is obtained. Glass fiber for use in the present invention has a maximum tensile strength of 6.3–6.9 g/d (denier) in standard state and 5.4–5.9 g/d in the wet state, and does not absorb moisture. In addition, the heat resistance of the glass fiber does not change when heated up to 300° C., and the glass fiber has adiabeatic effects and is not flammable.

Therefore, the glass fiber may be used in accordance with the present invention as a reinforcement material.

G. Calcined diatomaceous earth

Calcined diatomaceous earth is obtained by calcining diatomaceous earth containing colloidal silica and water at high temperature. The resulting product is difficult to react with acids, but may be used as fillers having adiabatic effects. Furthermore, when the diatomaceous earth is mixed with thermoplastic resin, the mixture has improved impact resistance.

The calcinated diatomaceous earth used in accordance with the present invention has physical properties as follows:

| | | |
|---|---|---|
| Composition: | SiO$_2$ | 88.1% |
| | Al$_2$O$_3$ | 4.8% |
| | Fe$_2$O$_3$ | 1.0% |
| | CaO | 0.9% |
| | MgO | 0.5% |
| | Other | 4.3% |
| | Porosity | 89% |
| | Volume | 10–20 |
| | Specific Gravity | 0.25 |
| | Hardness | 4.3–6.6 |

As stated above, it has been found that compositions, which include fillers and additives as organic materials and inorganic materials mixed with thermoplastic resin, have the following characteristics:

1. Plasticity influences heat resistance, impact resistance and wear resistance. However, oil resistance and water resistance are reduced with an increase of plasticity, and elasticity is increased.

2. When the number of bridging combinations from a network structure is increased, heat resistance, water resistance, impact resistance, wear resistance and oil resistance are increased and elasticity is reduced.

Further, acid compositions from the wood flour effect the pH values of the thermoplastic resin and the molding materials have defects reducing their life. However, the defatted rice bran and calcined diatomaceous earth may be added in order to overcome the adverse effect on the pH values.

When the celluloses of the waste cotton and wood flour are heated, they tend to dissolve by swelling, and are changed into a viscous mass because of partial gelatinization. Further, the gelatin composition contained in the leather powder has gelatinization at the same time, and the adhesive effects are increased to nearly double.

The thermoplastic resin molding product for use in the vehicle lining field disclosed herein are generally in the form of a thin plate. And for producing such plates it is necessary to have a homogeneous admixture of thermoplastic resin, in particular, polypropylene; fillers from the industrial wastes such as wood flour, leather powder and defatted rice bran powder. Additives for example, asbestos, waste cotton (from industrial waste), chopped glass fiber (from industrial waste) and calcined diatomaceous earth, are also added to produce a composition which has excellent moldable properties, adherent properties, and light weight.

When the inorganic materials used in accordance with the present invention such as asbestos, chopped glass fiber and calcined diatomaceous earth are mixed with polypropylene it has been found that the admixture has excellent heat resistance, nonflammability and electrical insulation properties.

According to the present invention, a preferred composition range in weight percent is as follows:

polypropylene 50–60 Wt %, Wood flour 30–35Wt %, Defatted Rice Bran Powder 2–3 Wt %, Leather Powder 2–3 Wt %

Asbestos 2–3 Wt %, Waste Cotton 2–2.5 Wt %

Chopped glass fiber 1.7–2.3 Wt %, calcined diatomaceous earth 0.8–1.2 Wt %

The admixture may be thoroughly mixed in a conventional extruder-mixer and then extruded by conventional extrusion molding techniques. The thickness of the product is further controlled by means of a conventional 3 roll mill.

In order to illustrate preferable composition, fillers and additives according to the present invention, various comparative examples are shown as table 1.

TABLE 1

| Property and Unit | Size | Composition (Wt %) | | | |
|---|---|---|---|---|---|
| | | *P.P 75 | P.P 68 | P.P 60 | P.P 55.0 |
| | | A 20 | A 25 | A 30 | A 31.5, |
| | | B 5 | B 5 | B 1.5 | B 1, C 3.25, |
| | | | C 2 | C 1.5 | D 2, E 2.5, |
| | | | D 4 | D 4 | F 2.25, G 2.5 |
| | | | E 3 | E 3 | |
| Thickness (m/m) | — | 2.41 | 2.41 | 2.5 | 2.5 |
| Weight (Kg/m$^2$) | — | 2.96 | 2.56 | 2.48 | 2.38 |

TABLE 1-continued

| Property and Unit | Size | Composition (Wt %) | | | |
| --- | --- | --- | --- | --- | --- |
| Hardness | — | 82.6 | 93 | 97 | 98 |
| Water Absorption (%) | Below 10 | 2.3 | 1.5 | 0.18 | 0.15 |
| Nonflammability (mm/hr) | Below 80 | 60 | 72 | 40 | 38 |
| Dimensional (Width) Change (%) | 0.5 | 1.2 | 0.6 | 0.1 | 0.03 |
| (Length) | 0.5 | 0.8 | 1.0 | 0.2 | 0.08 |
| Bursting Strength (Kg/Cm$^2$) | No Burst at 25 | No Burst at 20 | Burst At 22 | Burst at 27 | Burst at 41 |
| Softening Point | — | 120 | 130 | 170 | 185 |
| Melting Point (°C.) | — | 170 | 180 | 185 | 190 |
| High temp Impact | No Crack at 110° C. × 3 hr | Crack | Crack | No Crack | No Crack |
| Low temp | No Crack at 40° C. | Crack | Crack | No Crack | No Crack |
| Odor (grade) | Above 4 | 2 | 3.5 | 4 | 4 |

Remarks
*P.P: Polypropylene,
A: Wood,
B: Calcined Diatomaceous Earth,
C: Defatted Rice Bran Powder,
D: Glass Fiber Chopped,
E: Asbestos,
F: Waste Cotton,
G: Leather Powder.

As shown in table 1, the compositions which include polypropylene, wood flour, calcined diatomaceous earth, defatted rice bran powder, chopped glass fiber, asbestos, and the composition including those compositions with waste cotton and leather powder, are satisfactory for use as vehicle lining materials such as door trim, shelf covering and package trays, etc.

The molded products for the composition according to the present invention also have a number of advantages as follows:

(1) The products made from the composition according to the present invention have high durability against transformation, discoloration and deterioration. Further, the products are durable at up to 110° C.

(2) The products disclosed herein also have excellent durability at −40° C.

(3) The products have excellent fatigue resistance.

(4) The products have excellently impact resistance.

(5) The products have excellent nonflammability when used as fireproof materials.

(6) The molded products are relatively light in weight because wood flour, defatted rice bran powder and leather powder which are light weight materials have been used.

(7) The products have excellent workability and adhesions for molding and working.

(8) When such products are used in the interior lining and as decoration materials, they have little or no odor and are safe for the environment.

(9) The cost of products are relatively low because they use industrial wastes such as waste cotton, defatted rice bran, leather powder and wood flour.

The process for manufacturing the molding products from the compositions according to the present invention will now be described in further detail.

A thermpolatic resin i.e. polypropylene is mixed with wood flour, defatted rice bran powder and leather powder, using the amounts indicated above. And then, asbestos, waste cotton and chopped fiber glass are added to the resulting admixture in the amounts indicated.

This final admixture is then thoroughly mixed by means of a conventional extruder mixer and the temperature of the extruder screw is maintained between 130° and 190° C.

Preferably, in case of softer formulations the screw temperature is maintained in the range of 180°–190° C. and for harder products in the range of 130°–150° C. during the mixing operation.

And, when the final admixture (final composition) is extruded after thoroughly mixing in the extruder-mixer, the admixture is reduced to pellets or a powder (grind) with relatively uniform particle size.

The uniform pellets of the admixture are then passed through an extrusion molding machine, at 190°–200° C. screw temperature and forced through a heated die.

After passing through the heated die, the thickness of the product is further reduced or controlled by a conventional 3 roll mill, and cut to size or otherwise formed into a desired shape by conventional means before or after passing along a cooling conveyor.

The products according to the present invention may be used in the field of marine lining materials and construction lining material (wall boards) etc.

The following example gives the composition of a preferred embodiment of the invention.

| | |
| --- | --- |
| Poly Propylene | 55.0 Wt % |
| Wood Flour | 31.5 Wt % |
| Defatted Rice Bran | 3.25 Wt % |
| Asbestos Fiber | 2.5 Wt % |
| Leather Powder | 2.5 Wt % |
| Waste Cotton | 2.25 Wt % |
| Caclined Diatomaceous Earth | 1.0 Wt % |
| Glass Fiber Chopped | 2.0 Wt % |

The above mixture was thoroughly mixed at 180°–190° C. in an extruder-mixer and extruder at about 190°–200° C. screw temperature in the extruding machine.

After extruding the mixture, through the heated die, the resulting sheet was cut. And the final thickness of the product was controlled by passing the product through a conventional 3 roll mill.

In the final step, the desired thermoplastic resin molded product was obtained by trimming, cutting and cooling.

Molded products made according to this embodiment are suitable for use in the vehicle lining field. Test results on such a product are shown in table 2.

TABLE 2

| Property and Unit | Size | Results |
|---|---|---|
| Thickness (m/m) | — | 3.1 |
| Weight (g/Cm$^2$) | — | 3.11 Kg/m2 |
| Dimensional Change (%) | | |
| Width | +0.5 / − | −0.5 |
| Length | +0.5 / − | 0 |
| Water Absorption (%) | Below 10 | 0.2 |
| Bursting Strength | No Burst at 25 Kg/m$^2$ | No Burst |
| Combustibility (mm/min) | Below 80 | 17 |
| Odor (grade) | Above 4 | 4 |
| Environmental Test | 110° C. × 3 hr room temp × 1 hr −40° C. × 3 hr room temp × 1 hr When 90% RH × 15 hr at 45° C. is 1 Cycle, none after cycles | None |

As shown in the table 2, the product for use in vehicle lining field has improved properties.

While the invention has been described with respect to its preferred embodiments, it will be obvious that various modifications may be made by those skilled in the art without departing from the scope of the following claims:

What is claimed is:

1. A thermoplastic composition for use in molding a vehicle lining or the like comprising a mixture of about 50 to about 60 weight percent of polypropylene, about 30 to about 35 weight percent wood flour, about 2 to about 3 weight percent defatted rice bran powder, about 2 to about 3 weight percent asbestos, about 1.7 to about 4.0 weight percent glass fiber and about 0.8 to about 1.2 weight percent calcined diatomaceous earth.

2. A thermoplastic composition for use in molding a vehicle lining or the like according to claim 1 in which the composition includes about 2 to about 3 weight percent leather powder and about 2.0 to about 2.5 weight percent cotton and in which the glass fiber is chopped and in the range of about 1.7 to about 2.3 weight percent.

3. A thermoplastic composition for use in molding a vehicle lining or the like according to claim 1 in which the composition includes about 60 weight percent polypropylene, about 30 weight percent wood flour, about 1.5 weight percent calcined diatomaceous earth, about 1.5 weight percent defatted rice bran powder, about 4 weight percent chopped glass fiber and about 3 weight percent asbestos.

4. A thermoplastic composition for use in molding a vehicle lining or the like according to claim 2 in which the composition includes about 55.0 weight percent polypropylene, about 31.5 weight percent wood flour, about 3.25 weight percent defatted rice bran powder, about 2.5 weight percent asbestos fiber, about 2.5 weight percent leather powder, about 2.25 weight percent cotton, about 2.0 weight percent chopped glass fiber and about 1.0 weight percent calcined diatomaceous earth.

5. A thermoplastic product for use as a vehicle lining or the like molded from the composition according to claim 2.

6. A thermoplastic product for use as a vehicle lining or the like molded from the composition of claim 4.

7. A method for manufacturing thermoplastic products for use in vehicle linings or the like comprising the steps of:
 (a) providing the following ingredients in the following amounts: 50 to 60 weight percent of polypropylene; 30 to 35 weight percent wood flour, 2 to 3 weight percent leather powder, 2 to 3 weight percent defatted rice bran, 2 to 3 weight percent of chopped glass fiber and 0.8 to 1.2 weight percent of calcined diatomaceous earth;
 (b) mixing the ingredients from step(a) in a mixture under shear at an elevated temperature; and
 (c) forcing the heated mixture from step (b) through a heated die at about 190°–200° C. to thereby form a sheet like structure.

8. A method for manufacturing thermoplastic products for use in vehicle lining or the like according to claim 7 in which step (b) is carried out in an extruder-mixer having a screw temperature of about 180°–190° C.; and in which the mixture from step (b) is extruded through a heated die having a temperature of between 190° to 200° C.

9. A method for manufacturing thermoplastic products for use in vehicle linings or the like according to claim 7 which includes the steps of forming the sheet like material from step (c) to a predetermined form and cooling the formed structure.

10. A thermoplastic composition for use in molding a vehicle lining or the like according to claim 4, in which the polypropylene has an average molecular weight of about 800,000.

* * * * *

UNITED STATES PATENT AND TRADEMARK OFFICE
CERTIFICATE OF CORRECTION

PATENT NO. : 4,866,110
DATED : September 12, 1989
INVENTOR(S) : Chang Y. Lee

It is certified that error appears in the above-identified patent and that said Letters Patent is hereby corrected as shown below:

On the cover page under the heading "Assignee," after "Korea" please insert --, One-half interest--.

In column 3, line 14, please delete $(KG/Cm^2)$ and substitute therefor --$(Kg/Cm^2)$--.

In column 3, line 32, please delete "100°" and substitute therefor --110°--.

In column 4, line 33, please delete "specific a" and substitute therefor --a specific--.

In column 4, line 57, please delete "3Mgo.2Sio$_2$.2H$_2$O" and substitute therefor --$3MgO.2SiO_2.2H_2O$--.

In column 5, line 30, please delete "adiabeatic" and substitute therefor --adiabatic--.

In column 6, line 45, please delete "polypropylene" and substitute therefor --Polypropylene--.

In column 6, line 61, in TABLE 1 please delete "P.P 68" and substitute therefor --P.P 70--.

In column 6, line 63, in TABLE 1 please delete the second occurrence of "B 5" and substitute therefor --B 3--.

UNITED STATES PATENT AND TRADEMARK OFFICE
CERTIFICATE OF CORRECTION

PATENT NO. : 4,866,110
DATED : September 12, 1989
INVENTOR(S) : Chang Y. Lee

It is certified that error appears in the above-identified patent and that said Letters Patent is hereby corrected as shown below:

In column 6, line 65, in TABLE 1 plese delete the first occurrence of "D4".

In column 6, line 66, in TABLE 1 please delete the first occurrence of "E3".

In column 7, line 13, in TABLE 1 after "Point" please insert --(°C)--.

In column 7, line 14, in TABLE 1 please delete "(°C.)" and substitute therefor --(°C)--.

In column 7, line 17, in TABLE 1 after "110°" please delete "C." and substitute therefor --C--.

In column 7, line 19, in TABLE 1 after "40°" please delete "C." and substitute therefor --C--.

In column 7, line 44, please delete "excellently" and substitute therefor --excellent--.

In column 8, line 40, after "temperature" please insert --,--.

In column 8, line 52, please delete "Poly Propylene" and substitute therefor --Polypropylene--.

In column 8, line 58, please delete "Caclined" and substitute therefor -- Calcined--.

UNITED STATES PATENT AND TRADEMARK OFFICE
CERTIFICATE OF CORRECTION

PATENT NO. : 4,866,110
DATED : September 12, 1989
INVENTOR(S) : Chang Y. Lee

It is certified that error appears in the above-identified patent and that said Letters Patent is hereby corrected as shown below:

In column 8, line 62, after "and" please delete "extruder" and substitute therefor --extruded--.

In column 9, line 10, in TABLE 2 please delete "Kg/m2" and substitute therefor --$Kg/m^2$--.

In column 10, line 37, please delete "step(a)" and substitute therefor --step (a)--.

Signed and Sealed this

Fifth Day of November, 1991

Attest:

HARRY F. MANBECK, JR.

Attesting Officer

Commissioner of Patents and Trademarks

REEXAMINATION CERTIFICATE (1352nd)
United States Patent [19]
Lee

[11] B1 4,866,110

[45] Certificate Issued  Sep. 11, 1990

[54] THERMOPLASTIC COMPOSITIONS RESIN MOLDED PRODUCT FOR VEHICLE LINING AND METHOD FOR MANUFACTURING THE SAME

[75] Inventor: Chang Y. Lee, Busan, Rep. of Korea

[73] Assignee: Han Il E'wha, Seoul, Rep. of Korea

Reexamination Request:
  No. 90/001,889, Nov. 9, 1989

Reexamination Certificate for:
  Patent No.: 4,866,110
  Issued:    Sep. 12, 1989
  Appl. No.: 71,743
  Filed:     Jul. 9, 1987

[30] Foreign Application Priority Data

Jul. 9, 1986 [KR] Rep. of Korea ............... 5524/1986

[51] Int. Cl.$^5$ .................. C08K 5/54; C08K 3/34; C08L 35/00
[52] U.S. Cl. ............................. 524/11; 524/13; 524/15; 524/34; 524/448; 524/452; 524/492
[58] Field of Search .............. 524/11, 13, 15, 34, 524/448, 452, 492, 9, 442

[56] References Cited

U.S. PATENT DOCUMENTS 3,988,270 10/1976 Willis, Jr. et al. ............... 524/15
4,228,116 10/1980 Colombo et al. ............... 285/364

FOREIGN PATENT DOCUMENTS 1203747  1/1960 France .
3018527  6/1976 Japan .
4081936 12/1977 Japan .
9196369  4/1983 Japan .
 440869  5/1971 U.S.S.R. .

OTHER PUBLICATIONS

Frissel, "Effect of Fillers in Polyethylene", *Plastics Technology*, Nov. 1956, pp. 723–729.

*Primary Examiner*—Nathan M. Nutter

[57] ABSTRACT

A thermoplastic molded product useful in vehicle linings such as door trim, shelf covering and package trays is formed from a resin into a thin plate. The product is formed from a substantially uniform admixture of from about 50 to 60 weight percent of a polypropylene, from 30 to 35 weight percent of a wood flour, from 2 to 3 weight percent of a leather powder, from 2 to 3 weight percent of a defatted rice bran powder, from 2 to 3 weight percent of an asbestos fiber, from 2 to 2.5 weight percent of a waste cotton, from 1.7 to 2.3 weight percent of a chopped glass fiber, and from 0.8 to 1.2 weight percent of a calcined diatomaceous earth.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *